Oct. 3, 1961   B. E. DOMAGALSKI   3,002,299
TRENCH EXCAVATOR
Filed Nov. 26, 1957
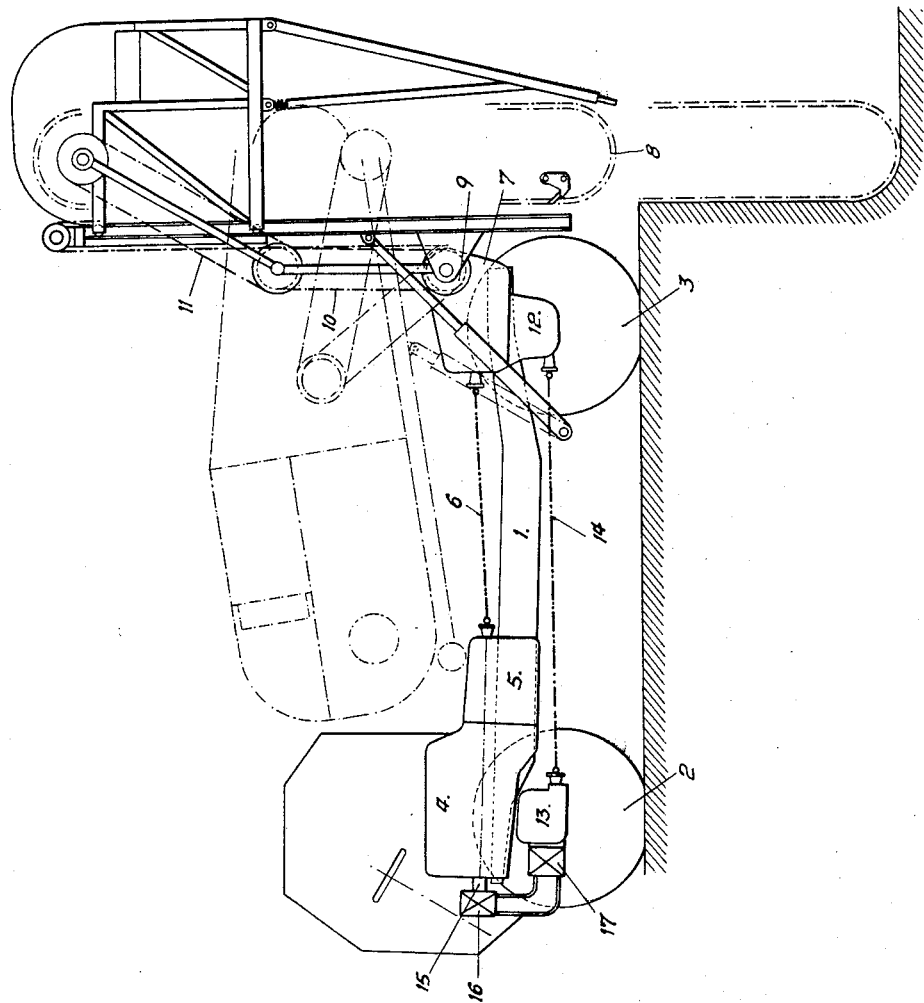
Bernard Edouard Domagalski
by A.H. Golden atty.

3,002,299
TRENCH EXCAVATOR
Bernard Edouard Domagalski, Vanves, France, assignor to
Societe Anonyme dite: Etablissements Matenin, Paris,
France, a company of France
Filed Nov. 26, 1957, Ser. No. 699,120
Claims priority, application France Jan. 18, 1957
2 Claims. (Cl. 37—86)

Trench excavators are already known which include a chain of buckets carried by a beam, said chain engaging the ground through its own weight so as to dig into it continuously during the progression of the excavator. Such excavators are carried on a chassis similar to that of a truck and the machinery is driven by the engine fitted on the chassis.

Now the present invention has for its object various improvements brought to machines of this type with a view to increasing both their adaptability and their efficiency in operation. Particularly, my invention makes possible the efficient driving of the excavator at the rear end of the truck through utilization of a slightly modified standard rear end traction transmission mounted in a slightly modified rear end housing.

According to a primary object of the invention, the engine drives directly a torque converter provided with an auxiliary gearing the output of which is operatively connected with a rear end housing for application of its energy selectively to the traction wheels or to the digging mechanism, the transmission to the wheels being obtained through a standard differential gearing. This provides four speeds for the wheels, the torque converter providing two basic speeds, i.e. two speeds for the digging chain.

The excavating mechanism is mounted on the rear end housing where it is best adapted to function through pivotal movement, and where it can best be actuated by gears within the rear end housing. In other words, the rear end housing is adapted not only to carry the usual transmission and differential, but also to support the excavating mechanism for operation and for actuation.

Further features and objects of my invention will appear in the reading of the following description, reference being made to the accompanying drawing given by way of example and by no means in a limiting sense. The single figure of said drawing is a diagrammatical elevational view of a preferred embodiment of the invention.

The excavator illustrated by way of example in the drawing is fitted on an automobile chassis 1 resting on front wheels 2 and on rear wheels 3. The single source of energy is constituted by the engine 4 which controls directly a torque converter 5 of a conventional type; there is provided an auxiliary output gearing for said converter so that two basic speeds are obtained at the output end of said converter, as is common in this art. The movement is then transmitted from the converter through a transmission shaft 6 to a rear end transmission housing 7. This housing not only includes the standard gearing and differential for driving the traction wheels, but also additional gearing so that movement may be contributed either to the rear wheels 3 or to the digging means 8 through the agency of bevel gear wheels 9 and chains 10 and 11. The transmission of energy to the wheels 3 is preferably obtained through further gearing well known per se to provide two speeds for each basic speed of the torque transformer, i.e. four speeds altogether. On the other hand, the transmission to the bevel gear wheels 9 is directed so that two slow speeds are available for the digging chain. The arrangement is such that by operation of suitable gear shift means I drive selectively either the rear axle or the digging chain but cannot ever drive both simultaneously.

A part 12 of the rear end housing contains gears connected with the differential of the front axle 13 through a shaft 14, and is engaged or otherwise as desired so that said front axle may form a driving axle when required.

To the front of the engine 4, an auxiliary output shaft 15 controls a hydraulic pump 16 controlling a hydraulic power unit 17 operating at an adjustable speed and coupled in its turn with the front axle 13.

The arrangement which has just been described allows the driver to obtain through actuation of suitable control means within his reach, the following different manners of operating the machine:

(1) Travelling on a road after the manner of a truck in which case the rear wheels form the sole driving axle while the digging chain is folded back into the position illustrated in dot-and-dash lines; the combination of the torque transformer and of the transmission box provides four speeds which the driver may use as desired; no movement is transmitted to the bucket chain.

(2) Progressing over uneven ground in which case the front axle is engaged to provide four driving wheels; the driver may again use selectively four speeds and as in the preceding case, no movement is transmitted to the bucket chain; in this latter case, the rear axle transmits its movement to the front axle through the shaft 14.

(3) When the excavator serves for digging, the transmission is controlled to actuate the bucket chain through the beveled gears 9. The excavator mechanism is bodily rotatable on the rear end housing of my truck about the axis of the beveled gears 9 so as to be driven by gears 9 in all its rotated positions relatively to the truck.

In the three above cases, the torque converter 5 remains operative. Each time the resistant torque increases during progression of the vehicle over a road or on uneven ground, the torque converter produces automatically an increase in the driving torque which allows overcoming any slopes or hindrances which may be met. During the digging operation, the torque converter plays an important part since whenever the digging buckets are slowed down or held fast by any hindrance or through an increase in the compacity of the ground, the torque converter produces an increase in the driving torque and cooperates in the overcoming of said resistant torque. Those skilled in the art will now fully appreciate the extreme simplicity of the means through which I drive both the excavator mechanism and traction transmission utilizing a single torque converter, all through simple modification of a standard rear end housing.

Obviously the same mechanical arrangement associated in the manner disclosed may be used as well for endless track excavators.

What I claim is:

1. In a vehicle of the class described, a main frame, an engine and a fluid torque transmission secured to and driven by said engine, means mounting said engine and fluid torque transmission at the front end of said main frame, a traction unit comprising a rear end housing and traction wheels, said traction unit and rear end housing being mounted at the rear end of said main frame, drive means in said housing for imparting traction to the said traction wheels of said vehicle, excavating machinery, drive means including gearing within said rear end housing for driving said excavating machinery, means mounting said excavating machinery for bodily rotation on said rear end housing on the axis of a gear forming part of said drive means, control means for selecting which of said drive means is to be actuated whereby to actuate said excavating machinery or said traction wheels, and drive means extending from said fluid torque transmission into said rear end housing for contributing traction to said wheels and for actuating said excavating machinery.

2. In a vehicle of the class described, a main frame, an engine and a fluid torque transmission secured to and driven by said engine, means mounting said engine and fluid torque transmission at the front end of said main frame, a traction unit comprising a rear end housing and traction wheels, said traction unit and rear end housing being mounted at the rear end of said main frame, drive means in said housing for imparting traction to the said traction wheels of said vehicle, excavating machinery, drive means including gearing within said rear end housing for driving said excavating machinery, means mounting said excavating machinery for bodily rotation on said rear end housing, control means for selecting which of said drive means is to be actuated whereby to actuate said excavating machinery or said traction wheels, and drive means extending from said fluid torque transmission into said rear end housing for contributing traction to said wheels and for actuating said excavating machinery.

References Cited in the file of this patent

UNITED STATES PATENTS

| 830,642 | Chaquette | Sept. 11, 1906 |
| 2,658,342 | Banister et al. | Nov. 10, 1953 |
| 2,817,911 | Owen et al. | Dec. 31, 1957 |

FOREIGN PATENTS

| 1,132,693 | France | Nov. 5, 1956 |